Figure 1:
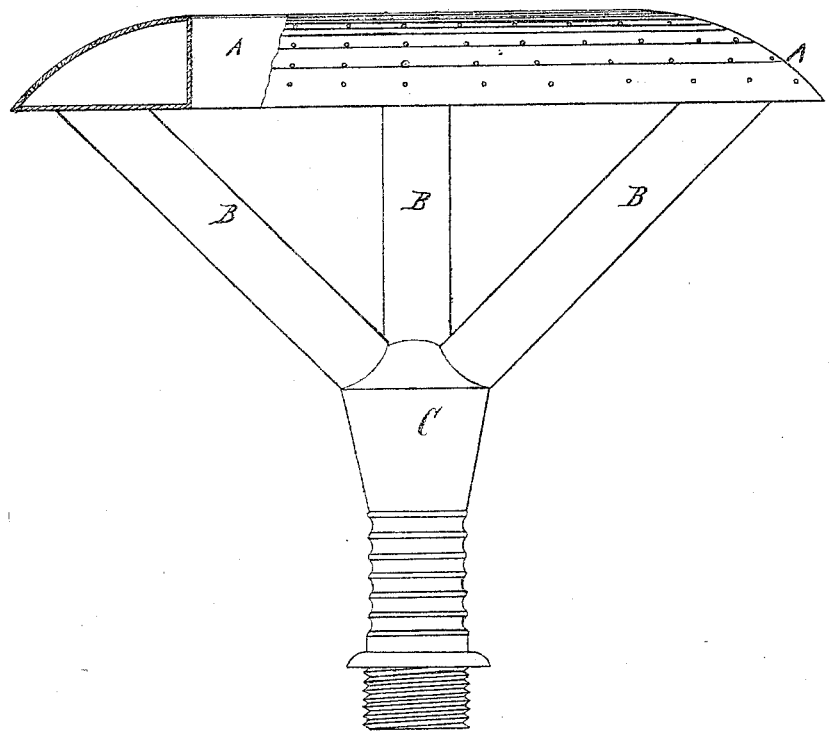
Figure 2:
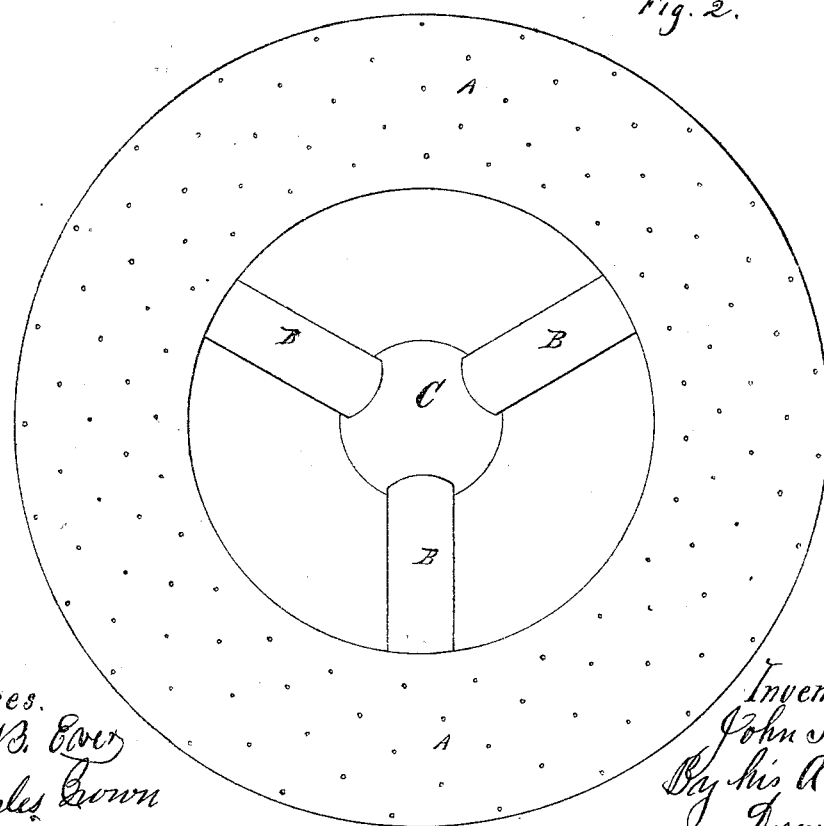

JOHN I. SPEAR.

Improvement in Garden-Sprinklers.

No. 114,362.　　　　　　　　　　Patented May 2, 1871.

Witnesses.

Inventor,
John I. Spear
By his Attys
Dewey & Co

United States Patent Office.

JOHN I. SPEAR, OF SAN FRANCISCO, CALIFORNIA.

Letters Patent No. 114,362, dated May 2, 1871; antedated April 27, 1871.

IMPROVEMENT IN GARDEN-SPRINKLERS.

The Schedule referred to in these Letters Patent and making part of the same.

To all whom it may concern:

Be it known that I, JOHN I. SPEAR, of the city and county of San Francisco, State of California, have invented an Improved Garden-Sprinkler; and I do hereby declare the following description and accompanying drawing are sufficient to enable any person skilled in the art or science to which it most nearly appertains to make and use my said invention or improvement without further invention or experiment.

My invention relates to an improved sprinkler, to be attached to the end of garden and other hose, for spraying or showering the water upon vegetation for watering purposes.

My sprinkler is intended to stand in a vertical position when in use, thereby causing it, by reason of its peculiar shape, to deliver the shower or spray of water equally upon all sides, thus not only being more effective as a sprinkler, but also forming an ornament to the grounds upon which it is used.

In order to explain my invention so that others will be able to understand its construction and operation, reference is had to the accompanying drawing forming a part of this specification, in which—

A is a hollow annular rim, a cross-section of which would be triangular in form. The upper face of this rim is rounded from the inner to the outer edge, as shown, and is perforated with numerous small holes in the manner of any ordinary sprinkler.

Pipes or hollow arms, B B B, are secured to the lower side of the rim A at points equidistant apart, and converge to a central hollow boss, C, which is attached to the garden-hose by any suitable means.

Any number of hollow arms B may be employed, or two circular V-shaped cylinders, one placed inside the other, so as to leave a space between them, could be used to connect the boss C with the rim A.

The shape of the rim A may be varied as desired; but I consider the one here shown as preferable, as the spray will be scattered more evenly upon the ground.

This sprinkler, after being connected with the hose, is set up so that the rim A will be horizontal. The water being then turned on, it will be thrown in a spray or shower in every direction from the sprinkler, insuring a uniform wetting of the ground within the radius of the discharge.

Having thus described my invention,

What I claim, and desire to secure by Letters Patent, is—

A sprinkler provided with an annular perforated discharge, substantially as described, for the purpose set forth.

In witness that the above-described invention is claimed by me I have hereunto set my hand and seal.

JOHN I. SPEAR. [L. S.]

Witnesses:
    JNO. L. BOONE,
    H. S. TIBBEY.